US008730864B2

(12) United States Patent  
Natarajan et al.

(10) Patent No.: US 8,730,864 B2  
(45) Date of Patent: May 20, 2014

(54) CONTEXT AWARE ADAPTIVE SWITCHING IN RECONFIGURABLE LOW EARTH ORBIT SATELLITE NETWORKS

(75) Inventors: Narayanan Natarajan, Marlboro, NJ (US); Anindo Bagchi, Ocean, NJ (US); William E. Stephens, Bel Air, MD (US)

(73) Assignee: Telcordia Technologies, Inc., Piscataway, NJ (US)

( * ) Notice: Subject to any disclaimer, the term of this patent is extended or adjusted under 35 U.S.C. 154(b) by 287 days.

(21) Appl. No.: 13/149,106

(22) Filed: May 31, 2011

(65) Prior Publication Data

US 2012/0134261 A1 May 31, 2012

Related U.S. Application Data

(60) Provisional application No. 61/349,368, filed on May 28, 2010.

(51) Int. Cl.  
*H04L 12/56* (2011.01)  
*H04B 7/185* (2006.01)

(52) U.S. Cl.  
USPC .......... 370/316; 370/229; 370/319; 455/12.1; 455/428; 455/430; 455/453

(58) Field of Classification Search  
USPC ................................ 370/202–255  
See application file for complete search history.

(56) References Cited

U.S. PATENT DOCUMENTS

| | | | | |
|---|---|---|---|---|
| 5,467,345 | A * | 11/1995 | Cutler et al. | 370/229 |
| 5,920,804 | A * | 7/1999 | Armbruster et al. | 455/13.2 |
| 6,366,761 | B1 * | 4/2002 | Montpetit | 455/12.1 |
| 6,553,226 | B1 * | 4/2003 | Watson | 455/428 |
| 7,477,597 | B2 * | 1/2009 | Segel | 370/230 |
| 2003/0032391 | A1 * | 2/2003 | Schweinhart et al. | 455/12.1 |
| 2003/0109220 | A1 * | 6/2003 | Hadinger et al. | 455/13.1 |
| 2003/0203717 | A1 * | 10/2003 | Chuprun et al. | 455/12.1 |
| 2008/0181108 | A1 * | 7/2008 | Hashmi et al. | 370/231 |

OTHER PUBLICATIONS

International Application No. PCT/US2011/038536—PCT International Search Report dated Oct. 11, 2011.

* cited by examiner

*Primary Examiner* — Andrew Chriss  
*Assistant Examiner* — John Lequang  
(74) *Attorney, Agent, or Firm* — Philip J. Feig

(57) ABSTRACT

A payload switching architecture for LEO satellite networks minimizes processing and storage requirements of payloads for deployment as small primary or secondary payloads, payloads perform only forwarding functions. Forwarding rules are provisioned in the payloads enabling them to reroute in case of failures or congestion without intervention from a ground station. Configuration rules are provisioned in the payloads enabling them to dynamically establish and remove interplane crosslinks without intervention from a ground station. The central network operations center on the ground computes forwarding rules and configuration rules for payloads and uploads the rules to the payloads.

9 Claims, 1 Drawing Sheet

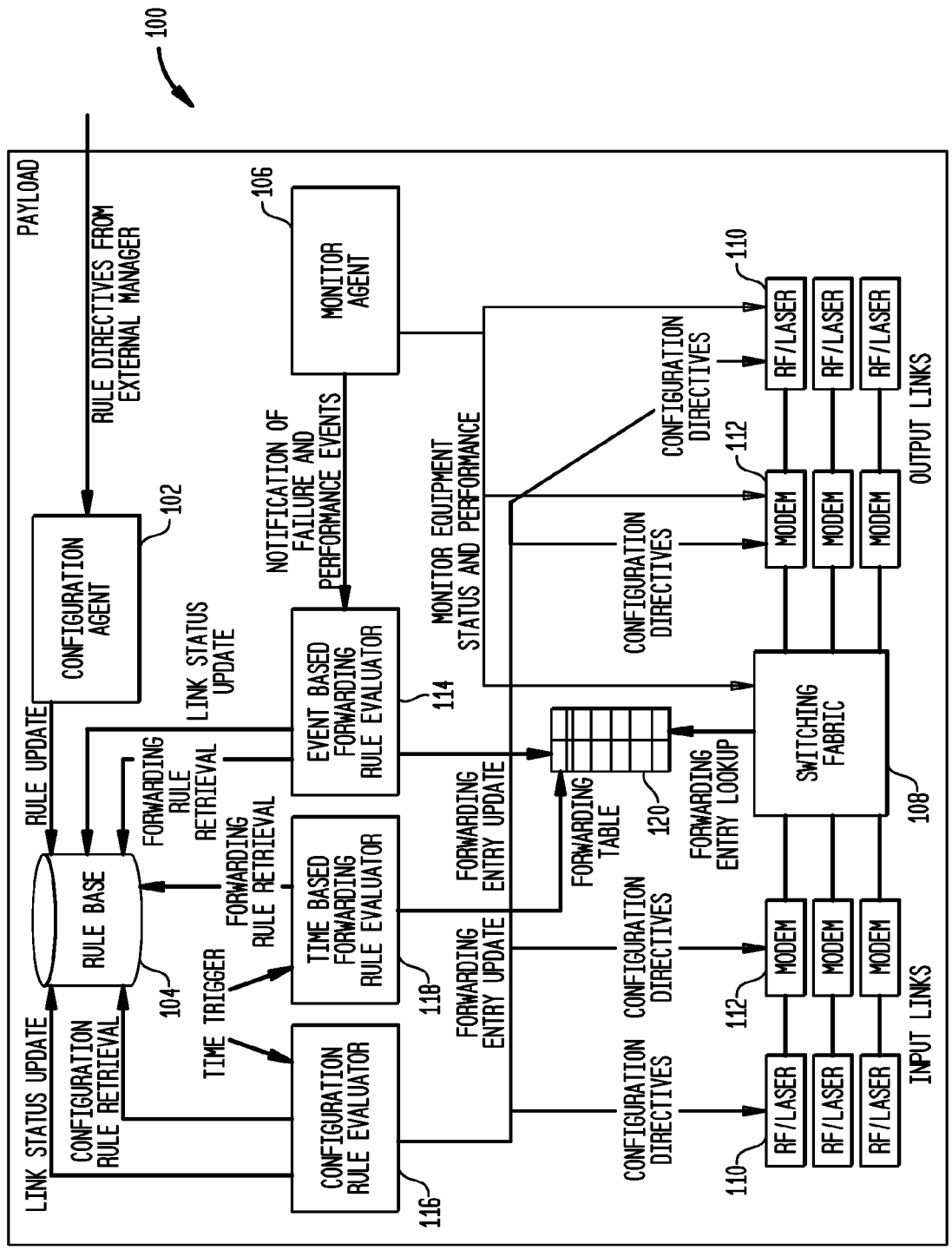

CONTEXT AWARE ADAPTIVE SWITCHING IN RECONFIGURABLE LOW EARTH ORBIT SATELLITE NETWORKS

CROSS-REFERENCE TO RELATED APPLICATIONS

This application claims the benefit of U.S. Provisional Application No. 61/349,368, filed on May 28, 2010, which is incorporated by reference herein in its entirety.

FIELD OF THE INVENTION

The present invention relates generally to Low Earth Orbit (LEO) satellite networks, and specifically to an adaptive Layer 2 switching method and system architecture for LEO satellite networks. Quite specifically, using time based network configuration and data forwarding rules received from network operations centers on the ground, payloads dynamically establish interplane crosslinks and switch Layer 2 frames across the LEO satellite network bypassing failure and congestion points in the network.

BACKGROUND OF THE INVENTION

Low Earth Orbit (LEO) satellite networks is a promising approach for global data communications (including broadband) in view of their low delay and bit error characteristics compared to Geostationary (GEO) satellites. Moreover, LEO satellites do not require high power antennas on ground terminals due to their close distance to the ground. However, because of the orbit, the communication link between a ground terminal and an LEO satellite will be available periodically for only a few minutes at a time. In order to provide continuous communication between ground terminals, the LEO satellites need to be interconnected via inter-satellite links (called crosslinks) and terminal-terminal data traffic will be routed over multiple satellites using these crosslinks. Typically, an LEO satellite network consists of multiple orbit planes, and each plane consists of multiple satellites. The satellite topology (neighbor relationship) within a plane remains invariant while inter-plane topology will change constantly; interplane crosslinks will be dynamically set up and removed. Terminal-satellite associations (uplink and downlink connectivity) will also be changing constantly. Traffic routing in such a dynamically changing network considering the Quality of Service (QoS) requirements of user traffic, network failures, and network congestion is a complex problem. Unlike network equipment in terrestrial networks, the size, weight, and power (SWaP) requirements of network equipment in satellites are very limited and stringent. Despite this constraint, the communication payload in an LEO satellite needs to provide a networking service that is robust, provides the required QoS, and adapts to changes in network conditions.

A prior solution described in V. V. Gounder, R. Prakash, H. Abu-Amara, Routing in LEO-Based Satellite Networks, IEEE Symposium on Wireless Communications and Systems, April 1999 proposes a virtual connection-oriented approach based on tag switching to route data in a LEO satellite network. Routing tables are computed by ground stations and uploaded to satellites at predetermined intervals. Routes are computed in ground stations for different network snapshots. Only forwarding tables for a limited set of snapshots are uploaded to LEO satellites. The payload switch does not have any route adaptation capabilities. All rerouting computations and decisions are made only by ground stations.

This networking solution described does not allow automatic adaptation by satellite payloads to network failure and congestion conditions. The network operations center on the ground receives such conditions, recomputes changes in network routes, and uploads new forwarding tables to the payloads. This solution has the following drawbacks: responses to network problems and anomalies take more time since all responses involve processing in the ground center and communication between the ground center and the satellites and there is lack of satellite autonomy. If the ground center-satellite network connectivity fails, no adaptation in data forwarding is possible by the payloads.

Another prior solution described in V. Mancuso, G. Bianchi, N. B. Melazzi, U. Bimbacher, Switched Ethernet Networking Over LEO Satellite, Proc. of IEEE IWSSC '05, September 2005 proposes an Ethernet Virtual LAN switching based networking solution for LEO satellites. Each possible path across the LEO network between a pair of ground terminals is viewed as a distinct VLAN. A network operations center on the ground determines all VLANs and uploads VLAN membership information to all payloads. Source terminals on the ground tag Ethernet frames with VLAN IDs, switching from one tag to another when their satellite connectivity changes. Switches in payloads build a spanning tree for each VLAN using standard spanning tree protocols.

This described solution requires payloads to incorporate spanning tree protocols thereby requiring more processing and storage capabilities in payloads. Furthermore, this solution does not address network adaptation to failures and congestion conditions.

A further prior solution described in U.S. Pat. No. 6,404,769, issued Jun. 11, 2002, inventor Vijay Kapoor, entitled "Directional Routing of Packets in a Satellite Network", proposes a method for routing packets across a satellite constellation that comprises multiple orbital planes, each plane carrying multiple satellites that are equally spaced in the plane. Satellites in the same orbital plane are connected via north-south crosslinks. Satellites in different orbital planes are connected via east-west crosslinks. When a connection is needed between two satellites that are in different planes, a controller station on the ground determines a route for the connection taking into account the traffic load on various crosslinks. The route so determined consists of a "band" which denotes a logical region in the constellation that is orthogonal to orbital planes. The controller provides this route information including the band information, the destination plane, and the destination satellite id to the source satellite which includes it in all packets belonging to that connection. Satellites forward packets using this route information by forwarding packets on the source plane until the specified band is reached, then on the band towards the destination plane, and finally on the destination plane towards the destination satellite. In this method, the satellites do not have any route adaptation capabilities. All routing decisions are made only by the controller on the ground.

This routing solution assumes that the satellite network topology is fixed. In comparison, the adaptive forwarding concept described in the present invention does not have this limitation and is applicable to satellite networks with dynamically changing topologies. In addition, the forwarding method described in the present invention is independent of the routing scheme used in the ground controller. For example, the present invention can support the routing solution just described as well as other routing schemes that consider dynamically varying satellite network topologies. The present invention does not include any specific routing method.

Several proposals have been made in the literature for distributed routing in LEO satellite networks; i.e., each payload router determines routing decisions independently for each packet. A specific solution described in E. Ekici, I. F. Akyildiz, M. D. Bender, A Distributed Routing Algorithm for Datagram Traffic in LEO Satellite Networks, IEEE/ACM Transactions on Networking, Vol. 9, No. 2, April 2001 proposes a distributed routing algorithm that is capable of avoiding congested network regions and is also capable of rerouting packets around failure points with low degradation in performance.

A still further prior solution described in T. R. Henderson, R. H. Katz, On Distributed, Geographic-Based packet Routing for LEO Satellite Networks, Proc. of IEEE Globecom 2000, December 2000 proposes a distributed routing algorithm that utilizes geographic information encoded in the address fields in packet headers and computes satellite routes minimizing the geographic distance of routes.

Unlike these solutions, the present invention does not employ distributed routing by payloads to minimize SWaP requirements. Payloads perform only switching based on routes computed by network operations centers on the ground.

SUMMARY OF THE INVENTION

The present invention presents a link layer (Layer 2 in ISO and IETF protocol standards) switching concept and system architecture for LEO satellites. The invention has the following innovative features:

The payload performs only Layer 2 switching (forwarding) functions. Network routes are computed by Network Operations Centers on the ground and uploaded to the payload. This minimizes payload processing and storage requirements.

The invention enables provisioning of multiple data paths between ground terminals across the LEO satellite constellation. These multiple satellite paths may be used to support automatic rerouting upon network failures and network congestion.

These paths can traverse intraplane crosslinks and interplane crosslinks that are setup and removed on a recurring time schedule. Data between two ground terminals may be routed via different paths at different time instants.

The invention enables priority based traffic engineering. Traffic of different priorities between the same pair of ground terminals may be routed via different satellite paths. For example, higher priority traffic may be routed via paths with fewer satellite hops and lower priority traffic may be routed via paths with more satellite hops.

The invention facilitates flexible routing of data between ground terminals. Paths from different source ground terminals to the same destination terminal may traverse either a disjoint set of crosslinks or some shared crosslinks.

The invention will be better understood when the following description is read in conjunction with the accompanying drawings.

BRIEF DESCRIPTION OF THE DRAWINGS

FIG. 1 shows a payload switching architecture.

DETAILED DESCRIPTION

Referring to the figures, FIG. 1 shows a payload switching architecture 100.

The following are descriptions of the functional elements shown in FIG. 1.

Configuration Agent 102: Receives configuration rules and forwarding rules from an external manager and updates Rule Base 104 accordingly.

A configuration rule specifies when a crosslink should be dynamically established between two payloads (in different orbit planes) and the duration of the crosslink. When the duration ends, the crosslink is automatically removed. The protocols for crosslink establishment and removal are well known to those skilled in the art and hence are not described.

A configuration rule is of the form
<Neighbor Payload, Crosslink Termination, Link parameters, Start Time, End Time> where Neighbor Payload identifies the payload with which the crosslink is to be established;

Crosslink Termination is termination of the crosslink in the payload;

Link Parameters are parameters required for crosslink establishment including antenna orientation, power level, etc.

Start Time and End Time specify the time duration for the crosslink; the time duration will typically be a recurring interval.

A forwarding rule specifies how a Layer 2 frame received on a crosslink/uplink should be forwarded to another crosslink/downlink.

A forwarding rule is of the form
<Destination, Input Link, Start Time, End Time, Priority, Output Link 1, Output Link 2, . . . , Output Link n>
where Destination is the Destination MAC address in the Layer 2 frame received;

Input Link is the satellite crosslink/uplink on which the Layer 2 frame is received;

Start Time and End Time specify the time interval within which the rule is effective; the time interval will typically be a recurring interval.

Priority is the priority level assigned to the Layer 2 frame (in the range 0-7, 0 being the lowest and 7 being the highest priority) in accordance with IEEE 802.1pQ Tag standard;

Output Link 1, . . . , Output Link n is an ordered sequence of preferred crosslinks/downlink to which the received frame is to be switched; an Output Link in this sequence is selected if and only if either all previous Output Links in the sequence have either failed or congested (as determined by a preconfigured threshold)

A forwarding rule specifies the following forwarding behavior. A frame received from Input Link crosslink/uplink with destination MAC address set to Destination between the time interval Start Time and End Time and that has priority level Priority should be switched to the first found crosslink/downlink, if any, in the specified Output Link sequence, that has neither failed nor congested. If no such crosslink/downlink is found, the frame should be dropped.

Rule Base 104: Stores configuration rules and forwarding rules as well as Link failure and performance status information.

Monitor Agent 106: Monitors the health and performance status of communications equipment in the payload including the Switching Fabric 108, R/F or Laser equipment 110, and Modem 112. It sends a notification to Event Based Forwarding Rule Evaluator 114 if it detects a failure of an equipment or congestion in an output link (crosslink/downlink). Congestion is detected if the length of an output queue exceeds a preconfigured threshold.

Forwarding Table 120: A collection of forwarding entries of the form: <Destination, Input Link, Priority, Output Link> where Destination is the Destination MAC address in the Layer 2 frame received;

Input Link is the satellite crosslink/uplink on which the Layer 2 frame is received;

Priority is the priority level assigned to the Layer 2 frame (in the range 0-7, 0 being the lowest and 7 being the highest priority) in accordance with IEEE 802.1pQ Tag standard;

Output Link is the crosslink/downlink to which the received frame is to be switched.

Switching Fabric 108: Forwards Layer 2 frames received on an input link to an output link in accordance with entries in the Forwarding Table. It implements a strict priority scheduling; i.e., higher priority queues are serviced before lower priority queues. If there is no forwarding entry in the table that matches the Destination and Priority fields in the header in a received frame and the input link on which the frame is received, the frame is dropped.

Modem 112: Performs modulation and demodulation functions. Extracts Layer 2 frames for digital signals and generates digital signals from Layer 2 frames.

RF/Laser equipment 110: Transmits and receives digital signals over a crosslink/downlink/uplink in RF or optical format.

Configuration Rule Evaluator 116: Continuously evaluates configuration rules in Rule Base based on time triggers and dynamically establishes and removes crosslinks to neighbor payloads by issuing the necessary configuration directives to appropriate equipment in the payload and by controlling the execution of link management protocols. If a crosslink could not be established, it records the status in Rule Base.

Time Based Forwarding Rule Evaluator 118: Continuously evaluates forwarding rules in Rule Base based on time triggers and updates the Forwarding Table 120 in the following manner:

Upon receipt of a time trigger, the Time Based Forwarding Rule Evaluator determines which forwarding rules have become newly effective. For each such forwarding rule, it derives a forwarding entry and loads the entry in the Forwarding Table 120. It derives the forwarding entry in the following manner. For a forwarding rule <Destination, Input Link, Start Time, End Time, Priority, Output Link 1, Output Link 2, . . . , Output Link n>, the derived forwarding entry is <Destination, Input Link, Priority, Output Link> where Output Link is the first Output Link in the sequence of Output Links that has neither failed nor congested.

Upon receipt of a time trigger, the Time Based Forwarding Rule Evaluator determines which forwarding rules are no longer effective. For each such forwarding rule, it purges from the Forwarding Table the forwarding entry derived from the forwarding rule.

Event Based Forwarding Rule Evaluator 114: Continuously evaluates forwarding rules in Rule Base 104 based on link failure or congestion status notifications that it receives from Monitor Agent 106 and performs the following actions:

The Event Based Forwarding Rule Evaluator records the reported link status in Rule Base.

For each forwarding rule that contains the reported link in the Output Link sequence, it derives a new forwarding entry in the following manner. For a forwarding rule <Destination, Input Link, Start Time, End Time, Priority, Output Link 1, Output Link 2, . . . , Output Link n>, the derived forwarding entry is <Destination, Input Link, Priority, Output Link> where Output Link is the first Output Link in the sequence of Output Links that has neither failed nor congested. It replaces the old derived forwarding entry in the Forwarding Table with the new derived forwarding entry.

This payload switching architecture has several merits:

In the present invention, the satellite network performs only data forwarding functions. No complex route computations are performed by payloads. This minimizes SWaP requirements for payloads.

The architecture in the invention supports satellite autonomy. The satellite network performs data forwarding adapting to network conditions even if connectivity to network operation centers on the ground is lost or the ground centers have failed.

The payload switching architecture enables provisioning of multiple data paths between ground terminals across the LEO satellite constellation. These multiple satellite paths may be used to support automatic rerouting upon network failures and network congestion. These paths can traverse intra-plane crosslinks and inter-plane crosslinks that are setup and removed on a recurring time schedule. Data between two ground terminals may be routed via different paths at different time instants.

If a payload determines that a crosslink along a path has failed or is congested, the payload autonomously reroutes traffic along an alternative path that has been predetermined by the planning system. This reduces buffering in payloads and end-to-end communication latency. Payloads accomplish adaptive rerouting without requiring knowledge of the entire network topology or status. A payload needs to know only the failure or congestion status of its cross-links to perform adaptive rerouting upon crosslink failures or congestion.

The architecture clearly separates adaptive switching components from basic switching components, i.e., Switching Fabric 108 and Forwarding Table 120.

The architecture enables priority based traffic engineering. Traffic of different priorities between the same pair of ground terminals may be routed via different satellite paths. For example, higher priority traffic may be routed via paths with fewer satellite hops and lower priority traffic may be routed via paths with more satellite hops.

The architecture facilitates flexible routing of data between ground terminals. Paths from different source ground terminals to the same destination terminal may traverse either a disjoint set of crosslinks or some shared crosslinks.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions stored in a computer or machine usable or readable storage medium or device, which causes the computer or machine to perform the steps of the method when executed on the computer, processor, and/or machine. A computer readable storage medium or device may include any tangible device that can store a computer code or instruction that can be read and executed by a computer or a machine. Examples of computer readable storage medium or device may include, but are not limited to, hard disk, diskette, memory devices such as random access memory (RAM), read-only memory (ROM), optical storage device, and other recording or storage media.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

While there has been described and illustrated an adaptive Layer 2 switching method and system architecture for LEO satellite networks, it will be apparent to those skilled in the art that variations and modifications are possible without deviating from the broad principles and teachings of the present invention which shall be limited solely by the scope of the claims appended hereto.

What is claimed is:

1. In a Low Earth Orbit Satellite Network, a method for adaptively switching Layer 2 frames from an uplink or crosslink to another crosslink or downlink based on failure and congestion conditions of crosslinks and downlinks in satellite network payloads,
   wherein the payloads perform switching based on forwarding rules received from a planning system on the ground, where each forwarding rule specifies how a Layer 2 frame received on a crosslink/uplink should be forwarded to another crosslink/downlink, and where the forwarding rule is of the form
   <Destination, Input Link, Start Time, End Time, Priority, Output Link 1, Output Link 2, . . . , Output Link n>
   where
   Destination is a Destination MAC address in the Layer 2 frame received;
   Input Link is the satellite crosslink/uplink on which the Layer 2 frame is received;
   Start Time and End Time specify the time interval within which the rule is effective;
   Priority is the priority level assigned to the Layer 2 frame; and
   Output Link 1, . . . , Output Link n is an ordered sequence of preferred crosslinks/downlink to which the received frame is to be switched; an Output Link in the sequence is selected for forwarding if and only if either all previous Output Links in the sequence have either failed or is congested.

2. The method of claim 1, wherein the time interval within which the rule is effective is a recurring interval.

3. The method of claim 1, wherein the priority level is in the range from 0 to 7, 0 being the lowest and 7 being the highest in accordance with IEEE 802.1pQ Tag standard.

4. The method of claim 1, wherein a link is congested if the traffic exceeds a predetermined threshold.

5. The method of claim 1, wherein each payload autonomously performs adaptive switching of Layer 2 frames based on the evaluation of the forwarding rules stored in the payload, the destination address in the frame, the priority of the frame, and the failure and congestion conditions of its crosslinks and downlink as observed within the payload.

6. The method of claim 5, wherein evaluation of the forwarding rules based on time, failure conditions, and congestion conditions, is separated from the basic Layer 2 switching function based on the destination address and the priority information contained in the frames.

7. In a Low Earth Orbit Satellite Network, a method of dynamically establishing and removing crosslinks between payloads in different orbit planes according to configuration rules received from a planning system on the ground,
   where a configuration rule specifies when an interplane crosslink is to be established between two payloads and the duration of the crosslink, and is of the form
   <Neighbor Payload, Crosslink Termination, Link parameters, Start Time, End Time>where
   Neighbor Payload identifies the payload with which the crosslink is to be established;
   Crosslink Termination is termination of the crosslink in the payload;
   Link Parameters are parameters required for crosslink establishment including antenna orientation and, power level; and
   Start Time and End Time specify the time duration for the crosslink.

8. The method of claim 7, wherein the time duration is a recurring interval.

9. A system of adaptively switching Layer 2 frames from an uplink or crosslink to another crosslink or downlink based on failure or congestion conditions of crosslinks or downlinks in satellite network payloads, comprising;
   a Rule Base storing Forwarding Rules and Configuration Rules;
   a Configuration Agent that receives Forwarding Rules and Configuration Rules from a planning system on the ground and stores the rules in the Rule Base;
   a Monitor Agent that monitors the status of communications equipment in the payload and sends a notification to an Event Based Forwarding Rule Evaluator if the Monitor Agent detects a failure of an equipment or congestion in an output link ;

a Forwarding Table collecting forwarding entries of the form

<Destination, Input Link, Priority, Output Link>where

Destination is the Destination MAC address in a received Layer 2 frame;

Input Link is the satellite crosslink/uplink on which the Layer 2 frame is received;

Priority is the priority level assigned to the Layer 2 frame;

Output Link is the crosslink/downlink to which the received frame is to be switched;

a Switching Fabric switching Layer 2 frames received on an input link to an output link in accordance with entries in the Forwarding Table;

a Configuration Rule Evaluator evaluating configuration rules in the Rule Base based on time triggers and establishing and removing crosslinks to neighbor payloads by issuing configuration directives to the payload and by controlling execution of link management protocols, whereby if a crosslink could not be established, the Configuration Rule Evaluator records the status in the Rule Base;

a Time Based Forwarding Rule Evaluator evaluating forwarding rules in the Rule Base based on time triggers and updates form the Forwarding Table in the following manner:

upon receipt of a time trigger, Time Based Forwarding Rule Evaluator determines which forwarding rules have become newly effective, for each such forwarding rule, a Time Based Forwarding Rule Evaluator derives a forwarding entry and loads the forwarding entry in the Forwarding Table where the Time Based Forwarding Rule Evaluator derives the forwarding entry in the following manner: for a forwarding rule <Destination, Input Link, Start Time, End Time, Priority, Output Link 1, Output Link 2, . . . , Output Link n>, the derived forwarding entry is <Destination, Input Link, Priority, Output Link>where Output Link is the first Output Link in the sequence of Output Links that has neither failed nor congested, and upon receipt of a time trigger, the Time Based Forwarding Rule Evaluator determines which forwarding rules are no longer effective, and for each such no longer effective forwarding rule, the Time Based Forwarding Rule Evaluator purges from the Forwarding Table the forwarding entry derived from the forwarding rule;

an Event Based Forwarding Rule Evaluator evaluating forwarding rules in the Rule Base based on link failure or congestion status notifications received from the Monitor Agent and performing the following actions:

the Event Based Forwarding Rule Evaluator records the reported link status in the Rule Base;

for each forwarding rule that contains the reported link in the Output Link sequence, the Event Based Forwarding Rule Evaluator derives a new forwarding entry in the following manner:

for a forwarding rule <Destination, Input Link, Start Time, End Time, Priority, Output Link 1, Output Link 2, . . . , Output Link n>, the derived forwarding entry is <Destination, Input Link, Priority, Output Link>where Output Link is the first Output Link in the sequence of Output Links that has neither failed nor congested; and the Event Based Forwarding Rule Evaluator replaces the old derived forwarding entry in the Forwarding Table with the new derived forwarding entry.

\* \* \* \* \*